United States Patent [19]

Maeda et al.

[11] Patent Number: 4,913,555

[45] Date of Patent: Apr. 3, 1990

[54] WHIPPING MACHINE

[75] Inventors: Yoshinari Maeda; Tokio Akai, both of Kasai, Japan

[73] Assignee: Sanyo Electric Co., Ltd., Osaka, Japan

[21] Appl. No.: 142,680

[22] Filed: Jan. 11, 1988

[30] Foreign Application Priority Data

Jan. 14, 1987 [JP] Japan .................................. 62-6557
Sep. 1, 1987 [JP] Japan .............................. 62-218594

[51] Int. Cl.⁴ .............................................. B01F 7/26
[52] U.S. Cl. ................................... 366/205; 366/206; 366/274; 366/314; 366/317; 366/601; 261/DIG. 16
[58] Field of Search ............... 366/241, 242, 244, 245, 366/247, 273, 274, 314, 601, 279, 142, 143, 250, 251, 205, 206, 317, 315; 116/227; 33/126.7 R; 73/290 B, 427, 428; 261/DIG. 16, 84; D7/376, 378; 99/348, 455; 318/390, 384, 317

[56] References Cited

U.S. PATENT DOCUMENTS

| | | | |
|---|---|---|---|
| 49,738 | 9/1865 | Estabrook | 33/126.7 R |
| 1,406,791 | 2/1922 | Werner | 366/315 |
| 2,546,949 | 3/1951 | Morrison et al. | 366/273 |
| 2,626,133 | 1/1953 | Reed | 366/206 |
| 2,757,909 | 8/1956 | Wayne | 366/319 |
| 2,761,659 | 9/1956 | Collura | 366/205 |
| 2,886,291 | 5/1959 | Frisby | 33/126.7 R |
| 3,421,528 | 1/1969 | Gomez et al. | 366/274 |
| 4,002,891 | 1/1977 | Porter | 366/601 |
| 4,209,259 | 6/1980 | Rains et al. | 366/273 |
| 4,390,825 | 6/1983 | Ginn | 318/390 |
| 4,568,193 | 2/1986 | Contri et al. | 366/197 |
| 4,574,226 | 3/1986 | Binder | 318/317 |
| 4,577,975 | 3/1986 | McCrory et al. | 366/205 |
| 4,664,529 | 5/1987 | Cavalli | 366/601 |
| 4,664,530 | 5/1987 | Kuromo et al. | 366/314 |

FOREIGN PATENT DOCUMENTS

| | | | |
|---|---|---|---|
| 562229 | 11/1957 | Belgium | 366/205 |
| 2228775 | 12/1972 | Fed. Rep. of Germany | 366/314 |
| 1218902 | 5/1960 | France | 366/314 |
| 57-27394 | 6/1982 | Japan . | |
| 50787 | 3/1984 | Japan | 318/384 |

Primary Examiner—Harvey C. Hornsby
Assistant Examiner—Joseph S. Machuga
Attorney, Agent, or Firm—Darby & Darby

[57] ABSTRACT

A whipping machine comprising: a mixer body provided with a motor therein; a container placed on said mixer body; and an agitator with at least a disc portion provided in close proximity to the inner bottom surface of said container, said agitator being rotatably provided in said container substantially at the central portion of the bottom surface thereof in such a manner that the center axis of said discal portion is perpendicular to said bottom surface so as to agitate and whip a material charged into said container, and said disc portion being integrally provided with an indicator rod which protrudes upward from the center of the rotation of said disc portion and has a mark for indicating the height that the upper surface of the central portion of the whipped material is to reach when said material charged into said container has been whipped to said predetermined degree by the rotation of said agitator, which is suitable for whipping ice cream materials.

16 Claims, 11 Drawing Sheets (a)

(b)

(c)

WHIPPING MACHINE

BACKGROUND OF THE INVENTION

1. Field of the Invention

The present invention relates to a whipping machine for whipping a material and, more particularly, to a whipping machine which is suitable for whipping an ice cream material consisting of raw (whipping) cream, milk, yolk, sugar, etc., subsequently to be freezed.

An example of such a whipping machine is disclosed in Japanese Patent Publication No. 33065/1985. This machine is composed of an agitator with a discal portion provided in a container, which whips a material, in particular, a single material such as white and fresh cream charged into the container.

This cooling machine, however, has no mark for indicating the degree of whipping, and since a material is circulated during operation, it is difficult to confirm to what degree the material has be whipped. Therefore, the user must stop the machine to see the whipped material at the time he senses it the right time, and if the whipping is insufficient, the machine is operated again for further whipping. There are naturally some cases where the material has been whipped to excess when the cooling machine is stopped. Above all, it is difficult to produce an ice cream material prepared for freezing by whipping a material consisting of raw cream, milk, yolk, sugar, etc. That is, in order to obtain a delicious ice cream, the material requires not to be completely whipped like white or raw cream but to be whipped to an overrun of 60 to 100% before freezing. Since it is difficult to confirm the degree of whipping in the conventional whipping machine, as described above, it is not easy for the whipping machine to produce such a good ice cream material.

SUMMARY OF THE INVENTION

The present invention provides a whipping machine comprising: a mixer body provided with a motor therein with the drived shaft of the motor substantially perpendicular thereto; a container placed on the mixer body in such a manner as to receive a material through an opening provided at the upper portion of the container; and an agitator with at least a disc portion provided in close proximity to the inner bottom surface of the container, the agitator being rotatably provided in the container substantially at the central portion of the bottom surface thereof in such a manner that the center axis of the disc portion is perpendicular to the bottom surface so as to agitate and whip a material charged into the container to a predetermined degree of whipping by the rotation of the agitator, thereby producing a material prepared for cooking, the disc portion being integrally provided with an indicator rod which protrudes upward from the center of the rotation of the disc portion and has a mark for indicating the height that the upper surface of the central portion of the whipped material is to reach when the material charged into the container has been whipped to the predetermined degree by the rotation of the agitator.

According to the present invention, since the indicator rod of the agitator has a special mark, it is easy to confirm that the material has been whipped to a predetermined degree.

The mark may be either the upper end of the indicator rod or a mark portion attached to the peripheral wall thereof below the upper end.

DETAILED DESCRIPTION OF THE PREFERRED EMBODIMENTS

Figure 1:
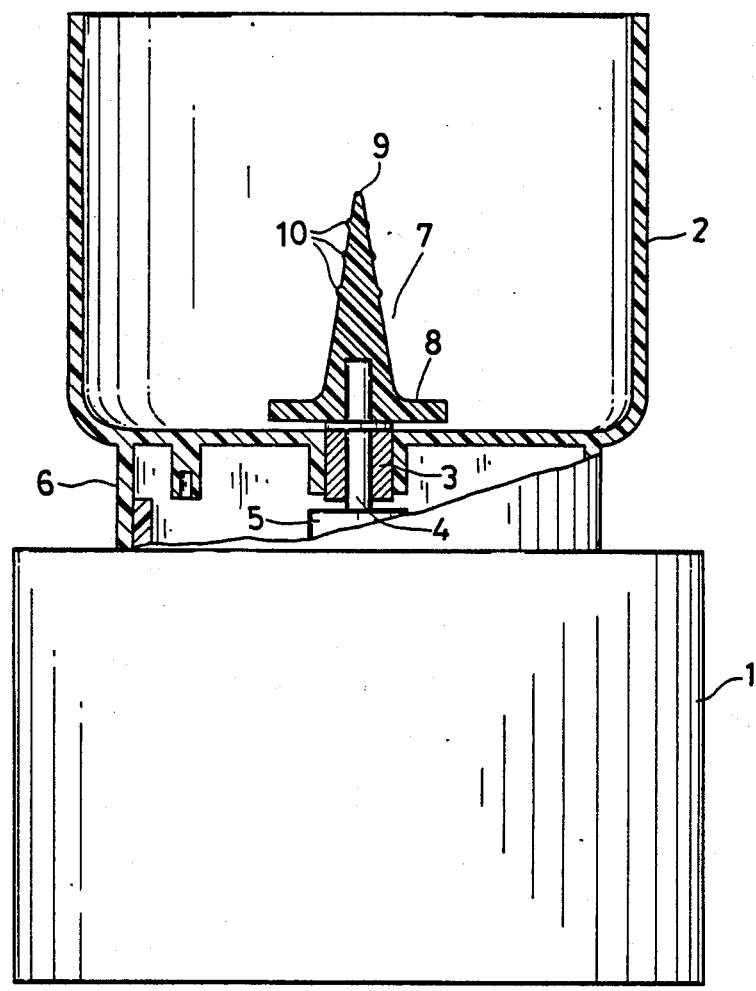
FIG. 1 is a cutaway side elevational view of the main part of an embodiment of a whipping machine according to the present invention.

A whipping machine according to the present invention is fundamentally composed of a mixer body provided with a motor therein with the drive shaft of the motor substantially perpendicular thereto; a container placed on the mixer body in such a manner as to receive a material through an opening provided at the upper portion of the container; and an agitator with at least a disc portion provided in close proximity to the inner bottom surface of the container, the agitator being rotatably provided in the container substantially at the central portion of the bottom surface thereof in such a manner that the center axis of the disc portion is perpendicular to the bottom surface so as to agitate and whip a material charged into the container to a predetermined degree of whipping by the rotation of the agitator, thereby producing a material prepared for cooking, and the disc portion being integrally provided with an indicator rod which protrudes upward from the center of the rotation of the disc portion and has a mark for indicating the height that the upper surface of the central portion of the whipped material is to reach when the material charged into the container has been whipped to the predetermined degree by the rotation of the agitator.

It is preferable that the agitator is so designed as to have an indicator rod having such a height that the upper end (or top) thereof is covered by a predetermined amount of material when the material is whipped to a desired degree. The agitator is also preferably further provided with an auxiliary agitator having an auxiliary indicator rod which is removably fitted over the agitator.

An agitator in accordance with the present invention may be composed of a discal portion which rotates in close proximity to the bottom surface of the container, a protruding rod portion which is provided substantially at the center of the rotation of the discal portion in such a manner as to protrude upward, and an indicator rod provided on the protruding portion such that the height of the indicator rod is controllable so that the upper end (or top) of the indicator rod is covered with a given amount of material in the container which has been whipped to a desired degree.

A whipping machine of the present invention is preferably provided with a control unit which controls the operation of the motor so that the agitator is rotated at a low speed for a predetermined time after the start of operation and is thereafter rotated at a high speed.

A whipping machine of the present invention is also preferably provided with a motor load current detecting portion and a control unit which controls the operation of the motor so that the number of revolutions of the agitator is increased or decreased in correspondence with the increase or decrease in the output detected by the motor load current detecting portion.

As an embodiment of the present invention, an ice cream mixer will be explained in the following with reference to FIGS. 1 to 3. It is to be understood that the present invention is not restricted to this embodiment.

Figure 2:
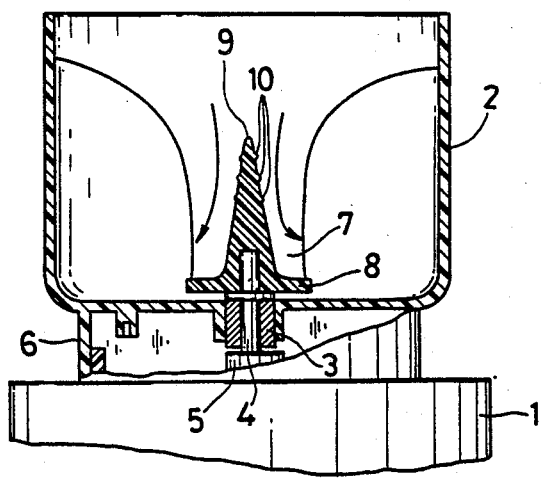
FIGS. 2(a), 2(b) and 2(c) are respectively sectional views of the main part of the embodiment shown in FIG. 1, explaining the operation thereof.
Figure 2:
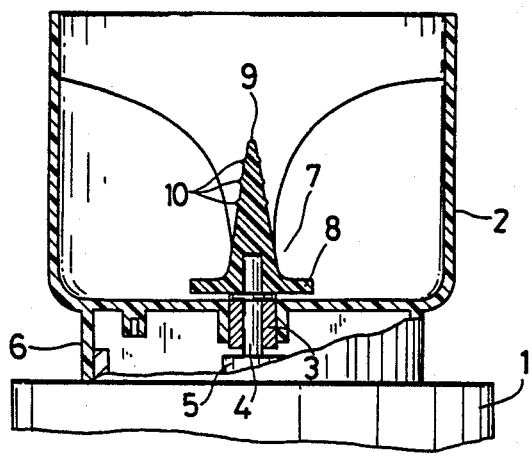
Figure 2:
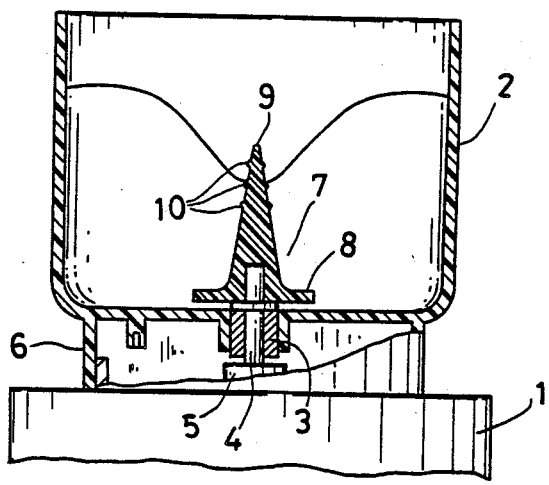
Figure 3:
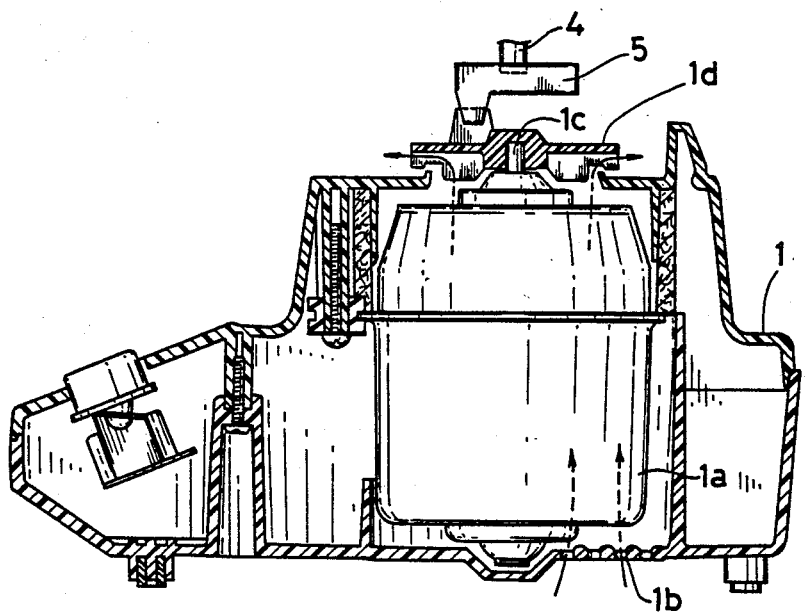
FIG. 3 is an explanatory view of the structure of the main part of the mixer body of the embodiment shown in FIG. 1.

In FIG. 1 to 3, the reference numeral 1 represents a mixer body with a motor 1a provided therein and air intake vents 1b at the bottom. A container 2 made of a polypropylene synthetic resin is removably placed over the mixer body 1, and has a cylindrical shape with a bottom, the inner diameter of the container 2 being substantially the same from the upper portion to the lower portion. A bearing 3 is provided at the center of the bottom surface of the container 2 and a rotary shaft 4 is rotatably supported by the bearing 3. To the lower portion of the rotary shaft 4, a coupling 5 is secured, which engages removably a coupling 1d at the upper end of an output shaft 1c of the motor 1a. The reference numeral 6 denotes a cylindrical pedestal portion which is provided at the bottom of the container 2 in such a manner as to extend downward therefrom in order to place the container 2 on the upper surface of the mixer body 1. The pedestal portion 6 is extended below the coupling 5 so as to prevent the coupling 5 from coming into contact with a table or the like when the container 2 is placed thereon.

An agitator 7 made of a polypropylene synthetic resin is mounted on the upper portion of the rotary shaft 4 and rotates at a high speed of about 10,000 to 20,000 rpm. The agitator 7 is composed of a discal portion 8 which is provided in close proximity and in parallel to the inner bottom surface of the container 2, and a substantially conical indicator rod 9 which is integrally provided with the disc portion 8 and protrudes upward from the center of the rotation of the discal portion 8. The indicator rod 9 is so designed as to have such a height that the upper end of the indicator rod 9 is covered with substantially the central portion of the conical upper surface of a predetermined amount of material consisting of raw cream, milk, yolk, sugar, etc. in the container 2 when the material has been whipped to a predetermined degree, namely, to what is called an overrun of 60% to 100% (increased in the volume to 1.6 to 2.0 times the original volume) and to a predetermined viscosity (to such a viscosity that the air in the material is not released to the outside). The indicator rod 9 is provided at the peripheral wall thereof with a plurality of annular protuberances 10 at the positions which the central portions of the above-described upper surfaces of the materials in the container 2 are to reach in correspondence with the respective amounts of materials when they have been whipped to a predetermined degree and to a predetermined viscosity.

The operation of the whipping machine of the present invention will now be explained. The container 2 is placed on the mixer body 1 while connecting the coupling 5 under the rotary shaft 4 to the coupling 1d at the upper end of the output shaft 1c of the motor 1a. A material consisting of fresh cream, milk, yolk, sugar, etc. is charged into the container 2 up to the upper end of the indicator rod 9 or to one of the protuberances 10, e.g., to the vicinity of the middle protuberance 10, and the motor 1a is driven to rotate the agitator 7 at a high speed of about 10,000 to 20,000 rpm. The material is then circulated due to the rotation of the agitator 7, and air is continuously supplied to the material through the passages indicated by the arrows in FIG. 2(a), thereby whipping the material At the initial stage of the operation, since the viscosity of the material is low, the material is flows about due to the rotational force of the discal portion 8, as shown in FIG. 2(a). However, since the material is agitated only by the resistance of the discal portion 8 and the container 2 has substantially the same diameter from the upper portion to the lower portion, agitation is smooth and the material is circulated along the inner wall of the container 2 without being messily scattered and overflowing the upper edge of the side wall of the container 2. During this time, the indicator rod 9 of the agitator 7 is therefore in the exposed state.

As the whipping operation proceeds, the viscosity of the material is increased and the circulation of the material due to the rotational force of the discal portion 8 is subdued, as shown in FIG. 2(b), so that the base of the indicator rod 9 is gradually covered with the material.

With further progress of the whipping, the material comes to have a predetermined viscosity, and the circulation of the material due to the rotational force of the discal portion 8 is lowered to a great extent. The upper surface of the material becomes cone-shaped, as shown in FIG. 2(c), and the middle protuberance 10 of the indicator rod 9 is covered with the central portion of the material. This is the time when the material has been whipped to a predetermined overrun and the original volume of the material has been increased to 1.6 to 2.0 times, thereby assuming the optimum state of an ice cream material prepared for freezing. If the material is charged into the container 2 up to the vicinity of the upper end (top) of the indicator rod 9 and agitated, when the upper end of the indicator rod 9 is covered with the shipped material, it is shown that the material has been whipped to a predetermined degree.

Figure 4:
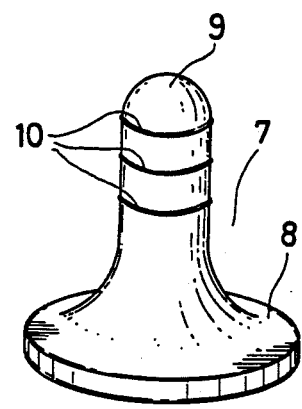
FIG. 4 is a perspective view of another example of an agitator.

The agitator 7 may have the indicator rod 9 of a substantially columnar shape, as shown in FIG. 4. The indicator rod 9 may have rings 10 of different colors as the marks, or the portions of the indicator rod 9 between the marks may have different colors from each other. Although the upper end and the protuberances 10 of the indicator rod 9 also serve as the guide for the amount of material to be charged into the container 2 in this embodiment, the guide for the amount of material to be charged into the container 2 may be provided, at the inner wall of the container 2.

In the apparatus made for an experiment, the container 2 had an inner diameter of 107 mm and a height of 90 mm, the discal portion 8 had an outer diameter of 33 mm and a thickness of 3 mm, and the height from the inner bottom surface of the container 2 to the upper end of the indicator rod 9 was 37 mm. When a material consisting of 200 g (64 wt%) of fresh cream, 60 g (19 wt%) of milk, 18 g (6 wt%) of yolk and 36 g (11 wt%) of sugar was charged into the container up to the vicinity of the upper end of the indicator rod 9, and the agitator 7 was rotated at a speed of 12,000 rpm, an ice cream material prepared for freezing was produced in about 3 minutes although there was a slight variation in accordance with the kind of raw cream or the like. According to the experimental apparatus, when the material was whipped to an overrun of 60 to 100% and to a predetermined viscosity, the agitating force was lowered so much that it was possible to prevent the material from being whipped any further even if the agitator 7 was rotated continuously, thereby eliminating the inconvenience such as the decomposition of the foam.

Figure 5:
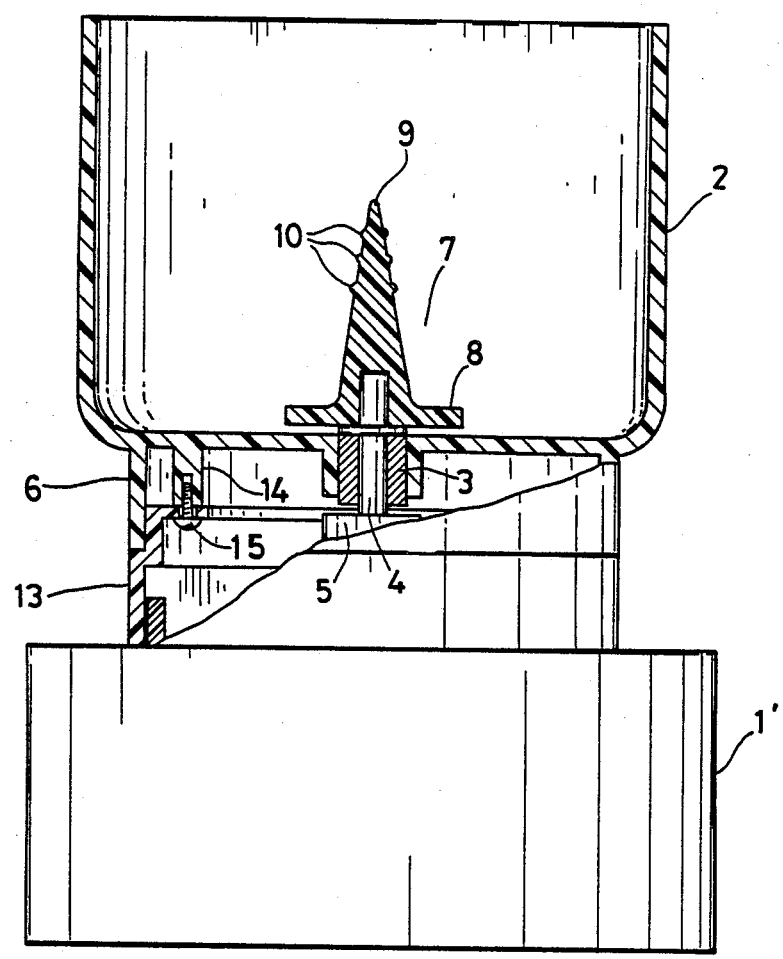
FIG. 5 is a partially cutaway view of the embodiment shown in FIG. 1 mounted on another main body.

The attachment of the whipping machine of the present invention which consists of the container 2, the agitator 7, etc. may be mounted on another main body 1' such as the main body of a juicer or the main body of a juicer and mixer. However, since the height of the coupling provided at the upper end of the output shaft of the motor is different by the kind of a machine, the attachment cannot be mounted thereon as it is. It is possible to apply the container 2, the bearing 3, the rotary shaft 4 and the agitator 7 to many kinds of machines by securing by a screw 15 a skirt 13 having an appropriate height in accordance with the height of the coupling to a boss 14 provided at the bottom of the container 2 in such a manner as to extend downward, as shown in FIG. 5, and by changing the skirts 13 in accordance with the kind of a machine.

As described above, according to the present invention, it is possible to provide a convenient whipping machine which produces an ice cream material prepared for freezing by whipping a material to an overrun of 60 to 100% instead of completely whipping it like a single material such as white to an overrun of 100 to 300% (increasing the volume by 2.0 to 4.0 times the original volume), and makes it easy to confirm that the material has been whipped to a predetermined degree by seeing the upper surface of the central portion of the material reaching the mark of the indicator rod, thereby enabling the judgement of the degree of whipping without stopping the operation of the machine or counting upon the sense of the user.

Another embodiment of a whipping machine of the present invention will be explained with reference to FIG. 6.

In this embodiment, an indicator rod protruding upward substantially from the center of the rotation of a discal portion of an agitator is so designed as to have such a height that the upper end (top) of the indicator rod is covered with a predetermined amount of material in a container when the material has been whipped to a predetermined degree, and an auxiliary agitator having an auxiliary indicator rod is provided so as to be removably fitted over the agitator.

Figure 6:
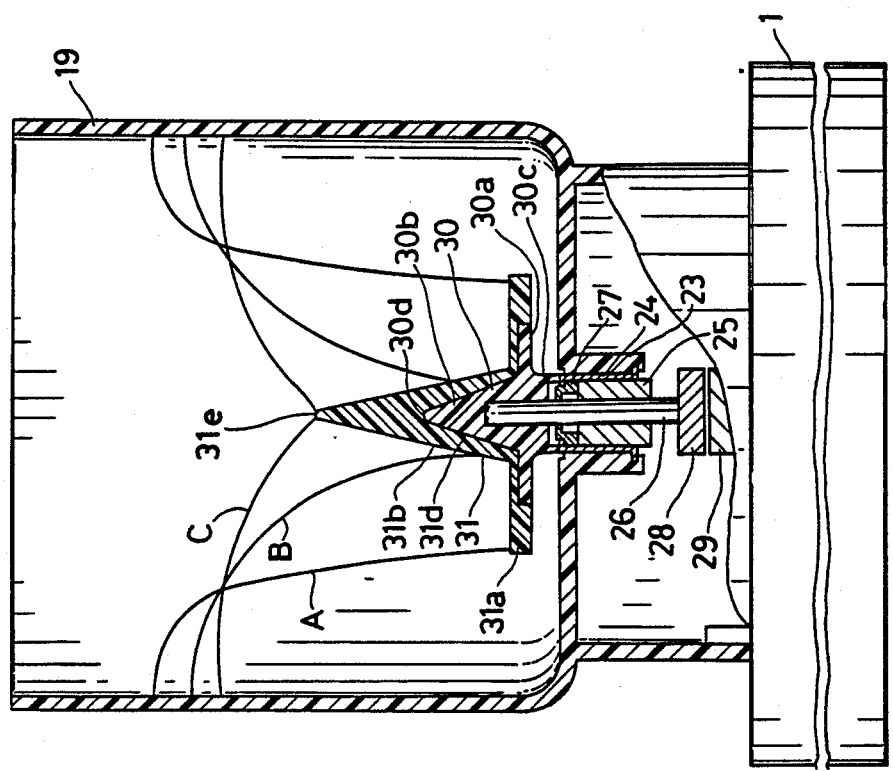
FIG. 6 is a partially cutaway view of another embodiment of a whipping machine according to the present invention.

In FIG. 6, the reference numeral 1 represents a mixer body provided with a motor (not shown) therein and 19 denotes a container of a polypropylene synthetic resin removably mounted on the mixer body 1. A cylindrical bearing portion 23 is provided at the center of the bottom surface and a metal housing 24 is fixed to the bearing portion 23. The reference numeral 25 denotes a bearing secured to the housing 24, and 26 denotes a rotary shaft rotatably supported by the bearing 25. An annular packing 27 is held between the collar portion of the housing 24 and the bearing 25, while the outer periphery of the packing 27 is in close contact with the housing 24 and the inner periphery thereof in close contact with the rotary shaft 26. The reference numeral 28 represents a magnet fixed at the lower end of the rotary shaft 26, the magnet opposing a magnet 29 at the upper end of the output shaft of the motor in close proximity thereto.

An agitator 30 made of polypropylene synthetic resin is mounted on the upper portion of the rotary shaft 26 and is composed of a disc portion 30a which is provided in close proximity and in parallel to the inner bottom surface of the container 19, and a substantially conical indicator rod 30b which is integrally provided with the disc portion 30a and protrudes upward from the center of the rotation of the disc portion 30a. The indicator rod 30b is so designed as to have such a height that the upper end thereof (mark) 30d is covered with substantially the central portion of a predetermined amount of material consisting of fresh cream, milk, yolk, sugar, etc. in the container 19 when the material has been whipped to an overrun of 60% to 100% (increased in the volume to 1.6 to 2.0 times the original volume) and to a predetermined viscosity. At the lower portion of the agitator 30, an annular protruding wall 30c is provided in such a manner as to extend downward therefrom, and the lower end of the protruding wall 30c is brought into contact with the upper surface of the collar portion of the housing 24 so as to prevent the rotary shaft 26 from sliding downward therefrom.

The reference numeral 31 denotes a first auxiliary agitator of a polypropylene synthetic resin which is mounted on the upper portion of the agitator 30 removably and concentrically therewith. The first auxiliary agitator 31 is composed on a first auxiliary disc portion 31a having a larger diameter than the disc portion 30a of the agitator 30, a first auxiliary indicator rod 31b having a substantially conical shape and protruding upward from the center of the rotation of the first auxiliary disc portion 31a, and a recess 31d which is engaged with the agitator 30 when the first auxiliary agitator 31 is fitted over the agitator 30. The first auxiliary indicator rod 31b is so designed as to have such a height that the upper end (top) thereof (first auxiliary mark) 31e is covered with substantially the central portion of double the predetermined amount of material when it has been whipped to an overrun of 60 to 100% and to a predetermined viscosity. Due to this larger amount, the first auxiliary indicator rod 31b is capped over the conical indicator rod 30b.

The operation of this embodiment will be explained in the following. The first auxiliary agitator 31 is mounted on the agitator 30 in accordance with the amount of material to be charged into the container 19. That is, when a predetermined amount of material is charged, the first auxiliary agitator 31 is removed, and when double the predetermined amount of material is charged, the first auxiliary agitator 31 is mounted on the agitator 30.

The case of producing double the predetermined amount of an ice cream material prepared for freezing will be explained hereinunder with reference to FIG. 6. When the first auxiliary agitator 31 is mounted on the agitator 30 for charging double the predetermined amount of material into the container 19, and the motor is driven, the magnet 28 is rotated together with the rotation of the magnet 29 due to the magnetic force between the magnets 28 and 29, whereby the first auxiliary agitator 31 is rotated. The material is then circulated due to the rotation of the first auxiliary disc portion 31a of the first auxiliary agitator 31, whereby air is continuously supplied to the material thereby whipping the material.

At the initial stage of the operation, since the viscosity of the material is low, the material flows about due to the rotational force of the first auxiliary disc portion 31a, as indicated by the symbol A in FIG. 6, and is circulated along the inner wall of the container 19. During this time, the first auxiliary indicator rod 31b is in the exposed state.

As the whipping operation proceeds, the viscosity of the material is increased and the circulation of the material due to the rotational force of the first auxiliary discal portion 31a is subdued, as indicated by the symbol B in FIG. 6, so that the first auxiliary indicator rod 31b is gradually covered with the material.

With further progress of the whipping, the viscosity of the material is further increased and the circulation of the material due to the rotational force of the first auxiliary discal portion 31a is lowered to a great extent. The upper surface of the material becomes cone-shaped, as indicated by the symbol C in FIG. 6, and the upper end (top) 31e of the first auxiliary indicator rod 31b is covered with the central portion of the material. This is the time when the material has been whipped to an overrun of 60 to 100% and to a predetermined viscosity, in other words, the original volume of the material has been increased to 1.6 to 2.0 times, thereby assuming the optimum state of an ice cream material prepared for freezing.

In this embodiment, since the rotational output of the motor is transmitted to the rotary shaft 26 only by the magnetic force of the magnets 28 and 29, no abnormal sound is produced even when the output shaft of the motor and the rotary shaft 26 come out of alignment.

When the whipping machine is not used, it is possible to store the first auxiliary agitator 31 in the state of being mounted on the agitator 30, thereby preventing the first auxiliary agitator 31 from being lost.

Figure 7:
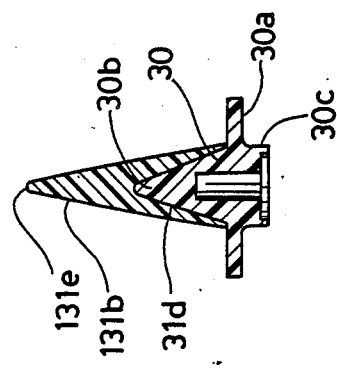
FIG. 7 is a sectional view of the agitator of still another embodiment with a first auxiliary agitator mounted thereon.

The first auxiliary agitator may be composed of only a second auxiliary indicator rod 131b with the upper end thereof (top) 131e serving as a second auxiliary mark, as shown in FIG. 7. In this case, however, since the disc portion 30a has a small diameter, it takes much time to whip double the predetermined amount of material with the disc portion 30a of the agitator 30, and the temperature of the material rises due to the heat conveyed from the bearing 25 through the housing 24, or the frictional heat between the rotary shaft 26 and the annular packing 27, further the frictional heat between the housing 24 and the disc portion 30a, thereby sometimes raising the temperature of the ice cream material to a comparatively high degree. When the temperature of raw cream is raised to 20° C. or higher, the oily content and the water content separate from each other, so that ice cream made of an ice cream material of a temperature of 20° C. or higher is inconveniently inferior in flavor and rough and unpleasant to the palate. It is therefore preferable to provide an auxiliary disc portion having a large diameter corresponding to the amount of material on the second auxiliary indicator rod 131b so as to increase the agitating force and produce an ice cream in a short time.

As described above, this embodiment is advantageous in that it is possible to detect that a material has been whipped to a predetermined degree by seeing the upper end of the indicator rod covered with the material, and in that when whipping an amount of material more than a predetermined amount with the auxiliary agitator is mounted on the agitator, it is possible to detect that a material has been whipped to a predetermined degree by seeing the upper end of the auxiliary indicator rod covered with the material. In other words it is possible to judge the degree of whipping with ease and certainty by the same judging method irrespective of the amount of material.

Still another embodiment of a cooking machine according to the present invention will be explained in the following with reference to FIGS. 8, 9 and 10. In this embodiment, a protruding rod portion of an agitator is provided with an indicator rod being controllable in accordance with a given amount of material in a container so that the upper end of the indicator rod is substantially covered with the material which has been whipped to a predetermined degree.

Figure 8:
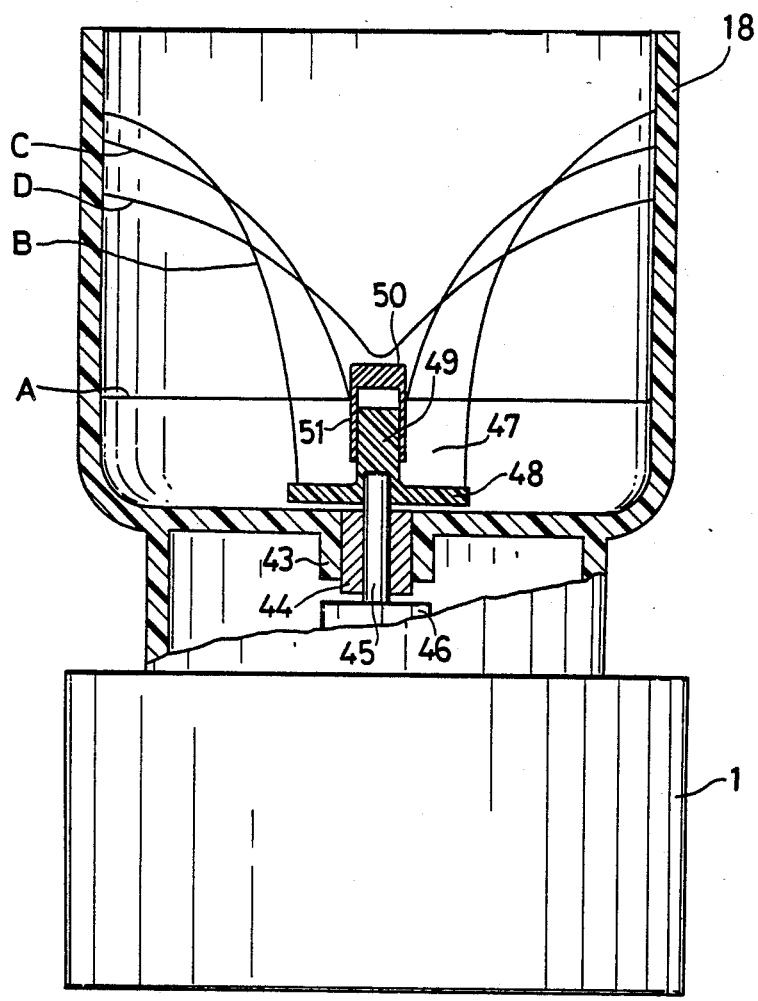
FIG. 8 is a partially cutaway side elevational view of a further embodiment of a whipping machine according to the present invention.
Figure 9:
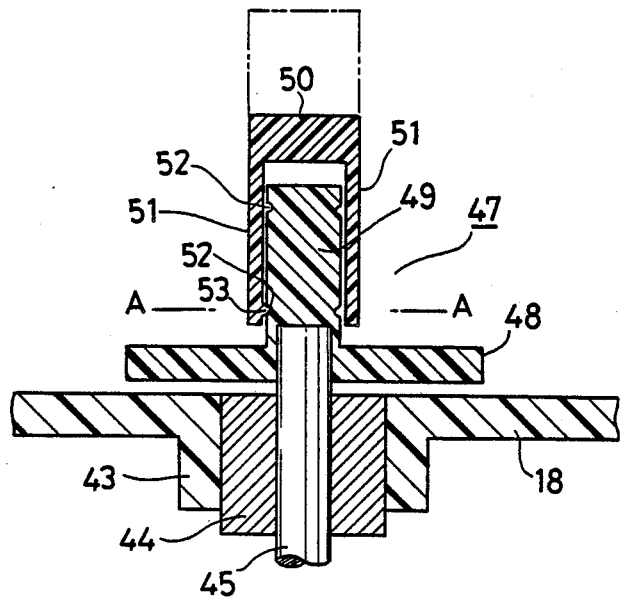
FIG. 9 is an enlarged sectional view of the main part of the embodiment shown in FIG. 8.
Figure 10:
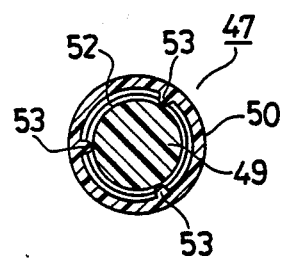
FIG. 10 is a sectional view of the main part shown in FIG. 9, taken along the line A—A.

In FIGS. 8, 9 and 10, the reference numeral 1 represents a mixer body provided a motor (not shown) therein, and 18 denotes a container of a polypropylene synthetic resin removably mounted on the mixer body 1. A cylindrical bearing portion 43 is provided at substantially the center of the bottom surface of the container 18 and a bearing 44 is secured to the bearing portion 43. The reference numeral 45 denotes a rotary shaft rotatably supported by the bearing 44 and penetrating through the bottom of the container 18. At the lower end of the rotary shaft 45, a coupling 46 which removably engages the coupling (not shown) of the motor is fixed.

An agitator 47 made of a polypropylene synthetic resin is mounted on the upper portion of the rotary shaft 45 and is composed of a disc portion 48 which is provided in close proximity and in parallel to the inner bottom surface of the container 18, and a columnar protruding rod portion 49 protruding upward from the center of the rotation of the discal portion 48. The reference numeral 50 represents a cylindrical indicator rod made of a polypropylene synthetic resin. The cylindrical indicator rod 50 has a closed upper surface and is removably mounted on the protruding rod portion 49. The inner wall 51 of the indicator rod 50 is engaged with the peripheral wall of the protruding rod portion 49, and the friction between a later-described protrusion 53 provided on the inner wall 51 and the protruding rod portion 49 keeps a given height of the indicator rod 50. The indicator rod 50 is positioned by a later-described positioning mechanism at a position (indicated by the solid line in FIG. 9) slightly above the position at which the indicator rod 50 completely covers the protruding rod portion 49 and a position (indicated by the dot and dash line in FIG. 9) at which the indicator rod 50 is mounted at the upper portion of the protruding rod portion 49. When the indicator rod 50 is positioned at the position indicated by the solid line in FIG. 9, namely, at the position slightly above the position at which the indicator rod 50 completely covers the protruding rod portion 49, the upper end (top) of the indicator rod 50 has such a height that the upper end thereof is covered with a predetermined amount of material consisting of raw cream, milk, yolk, sugar, etc. in the container 18 when the material has been whipped to an overrun of 60% to 100% (increased in the volume to 1.6 to 2.0 times the original volume) and to a predetermined viscosity. On the other hand, when the indicator rod 50 is positioned at the position indicated by the dot and dash line in FIG. 9, namely, at the position at which the indicator rod 50 is mounted at the upper portion of the protruding rod portion 49, the indicator rod 50 has such a height that the upper end thereof is covered with double the predetermined amount of material in the container 18 when the material has been whipped to an overrun of 60% to 100%.

In the position at which the indicator rod 50 completely covers the protruding rod portion 49, the indicator rod 50 has such a height that the upper end thereof is covered with 0.8 times the predetermined amount of material in the container 18 when the material has been whipped to an overrun of 60 to 100%.

Annular engaging grooves 52 are formed at the upper portion and the lower portion of the peripheral wall of the protruding rod portion 49. The engaging grooves 52 are provided at the respective positions at which the protrusion 53 of the indicator rod 50 is engaged with the grooves 52 in the state in which the indicator rod 50 is mounted at the position slightly above the position at which the indicator rod 50 completely covers the protruding rod portion 49, and in the state in which the indicator rod 50 is mounted at the upper portion of the protruding rod portion 49. The indicator rod 50 is positioned at the above-described two positions by the positioning mechanism consisting of the engaging grooves 52 and the protrusion 53.

The operation of this embodiment will now be explained. The height at which the indicator rod 50 is mounted is controlled in accordance with the amount of material charged into the container 18. That is, when a predetermined amount of material is charged, the indicator rod 50 is positioned at the position slightly above the position at which the indicator rod 50 completely covers the protruding rod portion 49 by the positioning mechanism, and when double the predetermined amount of material is charged, the indicator rod 50 is positioned at the upper portion of the protruding rod portion 49 by the positioning mechanism. In the other cases, the indicator rod 50 is held at the height in accordance with the amount of material by the frictional force between the peripheral wall of the protruding rod portion 49 and the protrusion 53 of the indicator rod 50.

The case of producing an ice cream material prepared for freezing from a predetermined amount of material will be explained in the following with reference to FIG. 8. The indicator rod 50 is positioned at the position slightly above the position at which the indicator rod 50 completely covers the protruding rod portion 49, and a predetermined amount of material is charged into the container 18 (indicated by the symbol A in FIG. 8). The motor is driven to rotate the agitator 47. The material is then circulated due to the rotation of the discal portion 48, whereby air is continuously supplied to the material and the material is whipped.

At the initial stage of the operation, since the viscosity of the material is low, the material is flown about due to the rotational force of the discal portion 48, as indicated by the symbol B in FIG. 8, and the material is circulated along the inner wall of the container 18. During this time, the indicator rod 50 is in the exposed state.

As the whipping operation proceeds, the viscosity of the material is increased and the circulation of the material due to the rotational force of the discal portion 48 is subdued, as indicated by the symbol C in FIG. 8, so that the indicator rod 50 is gradually covered with the material.

With further progress of the whipping, the viscosity of the material is further increased and the circulation of the material due to the rotational force of the discal portion 48 is lowered to a great extent. The upper end top of the indicator rod 50 is covered with the material, as indicated by the symbol D in FIG. 8. This is the time when the material has been whipped to an overrun of 60 to 100% and to a predetermined viscosity, in other words, the original volume of the material has been increased to 1.6 to 2.0 times, thereby assuming the optimum state of an ice cream material prepared for freezing.

When a solid material such as peanuts and chocolates which are ground into about 3 to 5 mm square is mixed into an ice cream material, the solid material sometimes remains at the bottom portion of the container 18 because the ice cream material has a low viscosity and is soft. In this case, if the indicator rod 50 is mounted at a slightly higher position in advance, the viscosity of the material is increased and since the material becomes hard, the solid material mixed with the raw material is uniformly dispersed therein without remaining at the bottom portion of the container 18.

The protruding rod portion 49 may be so designed as to have such a height that the upper end thereof is covered with an appropriate amount of, e.g., half the predetermined amount of material when it has been whipped to an overrun of 60 to 100%, thereby increasing the range of the producible amount of ice cream material.

As the guide for adjusting the position at which the indicator rod 50 is to be mounted, it is desirable to provide marks at the side surface of the protruding rod 49.

It is also desirable that the color of the indicator rod 50 is made different from that of a material so that it may be confirmed that the indicator rod is covered with the material.

As described above, this embodiment is advantageous in that it is possible to judge the degree of whipping by the same judging method with ease and certainty irrespective of the amount of material by adjusting the height at which the indicator rod is to be mounted.

Figure 11:
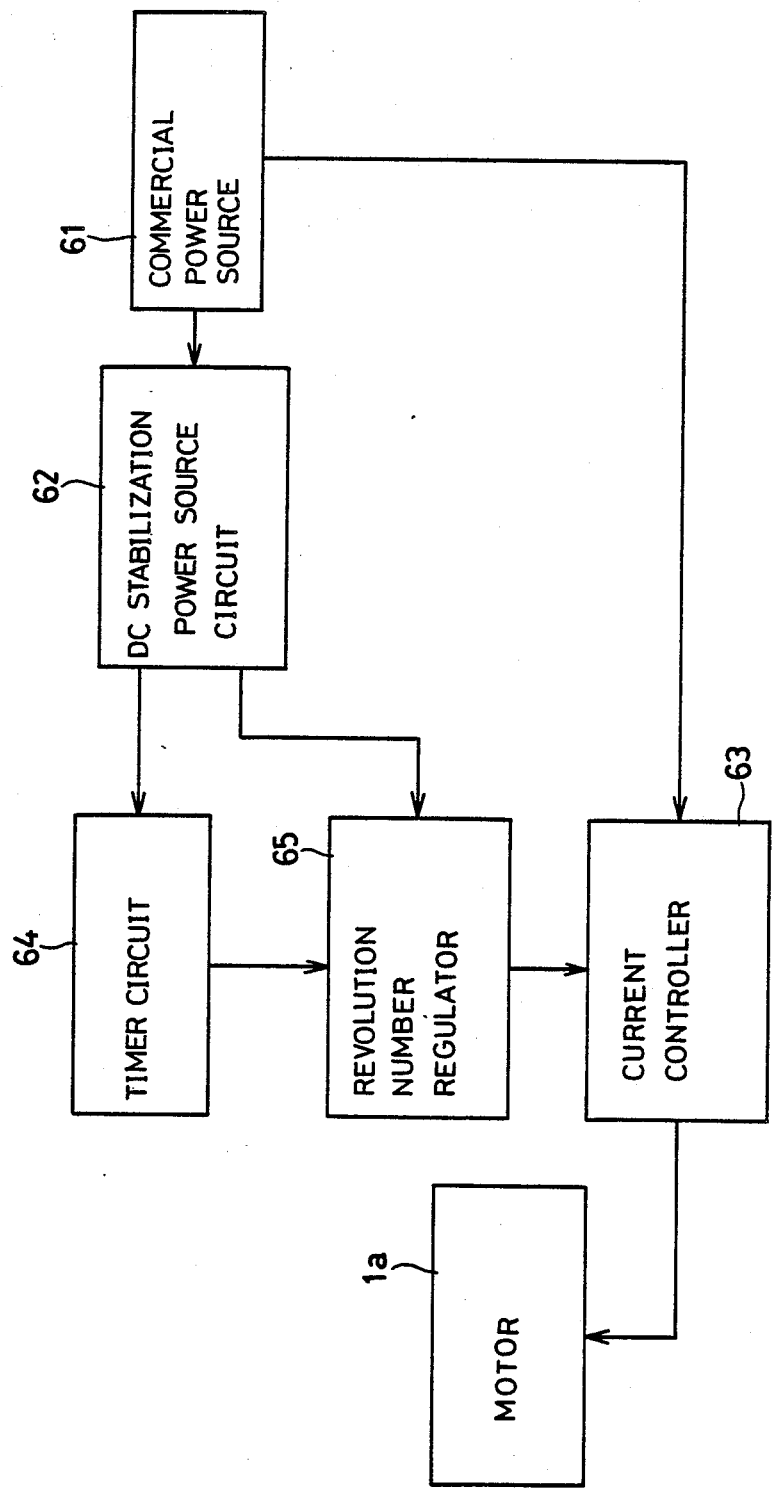
FIG. 11 is a schematic circuit diagram of a still further embodiment of a whipping machine according to the present invention.
Figure 12:
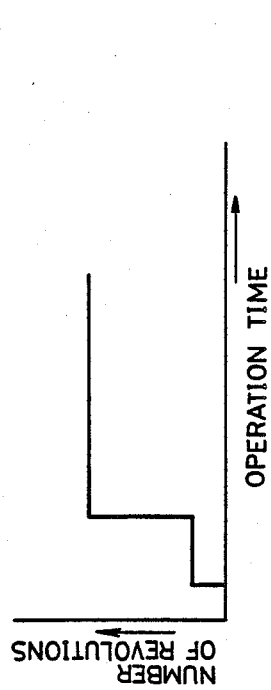
FIG. 12 shows the relationship between the operation time and the number of revolutions in the embodiment shown in FIG. 11.

FIGS. 11 and 12 show a further embodiment of a whipping machine according to the present invention. This embodiment is characterized in that a control unit for controlling the operation of the motor so that the agitator is rotated at a slow speed for a predetermined time from the start of the operation, and then is rotated at a high speed.

In FIGS. 11 and 12, commercial power source 61 is connected to a DC stabilization power source circuit 62 and a current controller 63, the current controller 63 being connected to the motor 1a so as to control the current supplied from the commercial power source 61 to the motor 1a. The DC stabilization power source circuit 62 is connected to a timer circuit 64 and a revolution number regulator 65 so as to supply a DC stabilization current to the timer circuit 64 and the revolution number regulator 65. The timer circuit 64 outputs a signal a predetermined time (20 to 30 seconds, in this embodiment) after the current is supplied, and the revolution number regulator 65 outputs a signal to the current controller 63 when a signal is input from the timer circuit 64. The current controller 63 reduces the current supplied to the motor 1a so as to rotate the motor 1a at a low speed (6,000 to 7,000 rpm, in this embodiment) until a signal is input from the revolution number regulator 65, and after the signal is input, the current controller 63 increases the current so as to rotate the motor 1a at a high speed (12,000 to 15,000 rpm, in this embodiment), as shown in FIG. 12. The current controller 63, the timer circuit 64 and the revolution number regulator 65 constitute a control unit.

The operation of this embodiment will now be explained. When a predetermined amount of material consisting of raw cream, milk, yolk, sugar, etc. is charged into a container 19 and the commercial power source 61 is supplied, the motor 1a rotates at a low speed of about 6,000 to 7,000 rpm. At the initial stage of the operation, although the viscosity of the material is low, since the rotational speed of the agitator 30 is low, the extent to which the material is flown about is small and the material is circulated in adequate contact with the disc portion 30a. The material agitating efficiency is therefore enhanced and with a rapid increase in the viscosity of the material, air mixes into the material.

As the whipping operation proceeds, the viscosity of the material is increased and the agitating efficiency is lowered, but when a predetermined time has passed since the power source is supplied, the motor 1a is rotated at a high speed of about 12,000 to 15,000 rpm. Since the viscosity of the material has been increased in this state, the material is not messily scattered and is agitated with good efficiency in adequate contact with the discal portion 30a even when the agitator 30 is rotated at a high speed.

With further progress of the whipping, the viscosity of the material is further increased and the circulation of the material due to the rotational force of the disc portion 30a is lowered to a great extent in spite of the high-speed rotation of the agitator 30. The upper end top of the indicator rod 30b is covered with the material. This is the time when the material has been whipped to an overrun of 60 to 100% and to a predetermined viscosity, in other words, the original volume of the material has been increased to 1.6 to 2.0 times, thereby assuming the optimum state of an ice cream material prepared for freezing.

Figure 13:
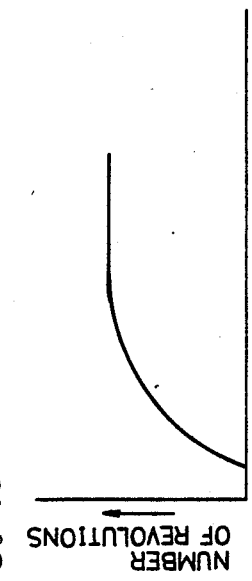
FIGS. 13(a), 13(b), 13(c) and 13(d) show respectively the relationships between the operation times and the number of revolutions in a still further embodiment.
Figure 13:
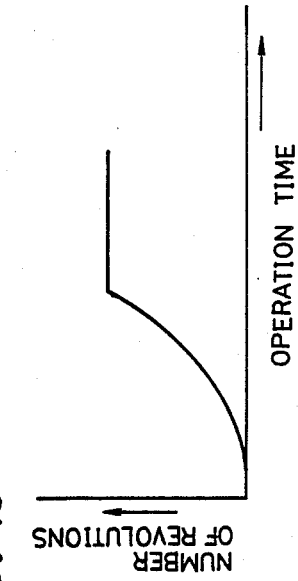
Figure 13:
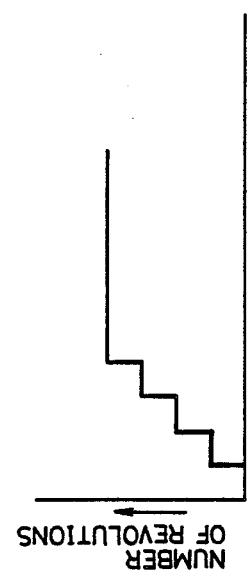
Figure 13:
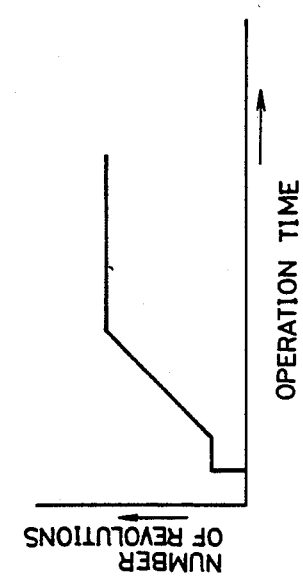

Although the number of revolutions of the motor 1a and, hence, the number of revolutions of the agitator 30 is rapidly changed from a low-speed rotation to a high-speed rotation in this embodiment, as shown in FIG. 12, it may be terraced sequentially, as shown in FIG. 13(a), or changed gradually, as shown in FIGS. 13(b), 13(c) and 13(d).

As described above, this embodiments enables the agitating efficiency to be enhanced at the initial stage of the operation by lowering the agitation force of the agitator when the viscosity of a material is low, and an ice cream material prepared for freezing to be produced in the optimum whipped state and in a short time by increasing the agitating force of the agitator with the increase in the viscosity of the material.

A still another embodiment of the present invention will be explained with reference to FIG. 14. In this embodiment, the whipping machine is provided with a motor load current detecting portion and a control unit which controls the operation of the motor so that the number of revolutions of the agitator is increased or decreased in correspondence with the increase or decrease in the output detected by the motor load current detecting portion.

Figure 14:
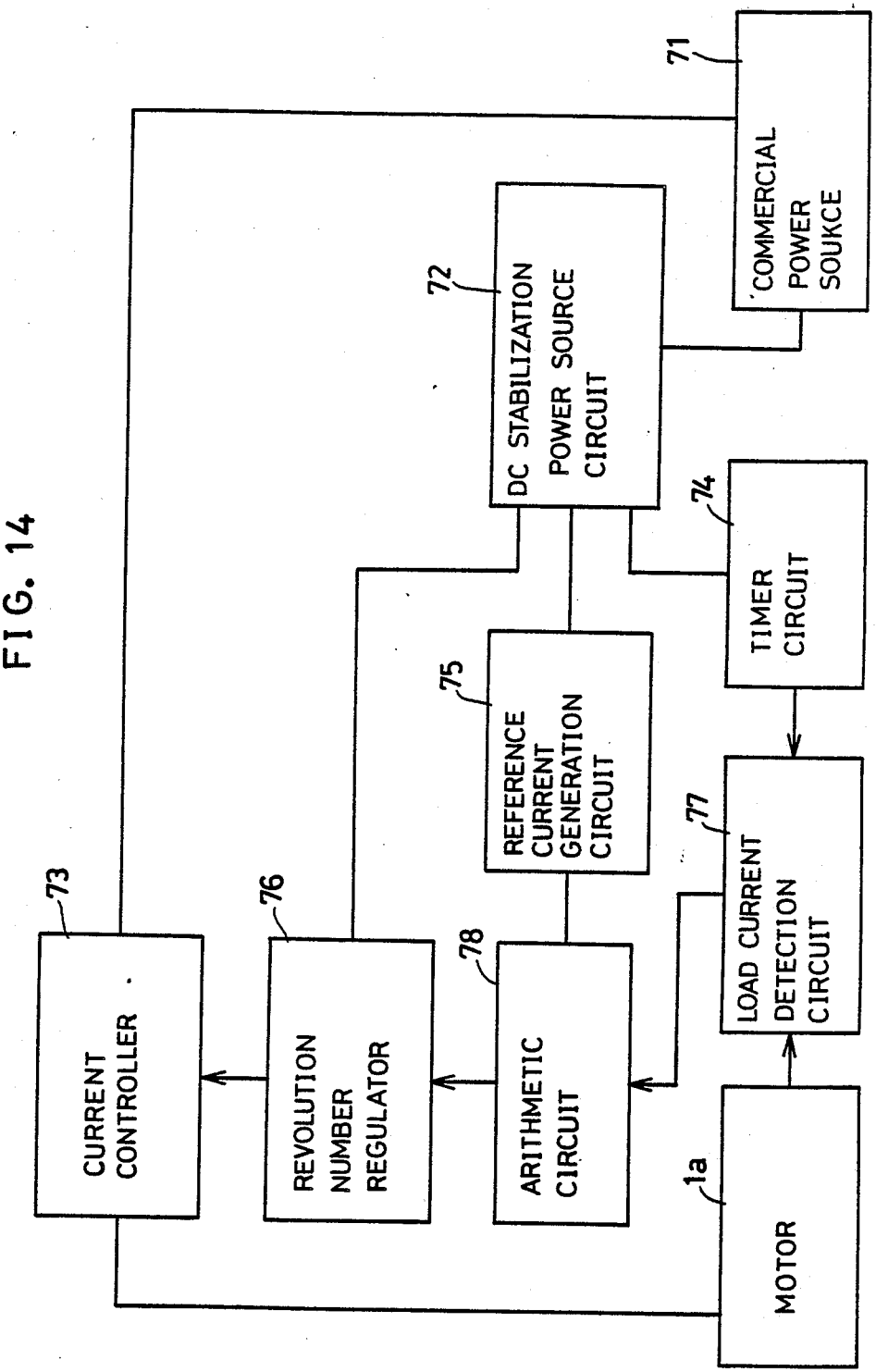
FIG. 14 is a schematic circuit diagram of a still further embodiment of a whipping machine according to the present invention.

FIG. 14 is a schematic circuit diagram. Commercial power source 71 is connected to a DC stabilization power source circuit 72 and a current controller 73. The current controller 73 is connected to the motor 1a and controls the current supplied from the commercial power source 71 to the motor 1a so as to rotate the motor 1a at a low speed (6,000 to 7,000 rpm, in this embodiment) and to rotate it at a middle speed (10,000 rpm, in this embodiment) or a high speed (14,000 rpm, in this embodiment) after a signal is input from a later-described revolution number regulator 76. The DC stabilization power source circuit 72 is connected to a timer circuit 74, a reference current generation circuit 75 and the revolution number regulator 76. The timer circuit 74 actuates a load current detection circuit 77 when a predetermined time (10 seconds, in this embodiment) has passed since the start of operation, namely, about a time when a material consisting of fresh cream, milk, yolk, sugar, etc. assumes a substantially uniformly mixed state due to the rotation of the agitator 30, and when another predetermined time (5 seconds, in this embodiment) has passed thereafter, so that the load current detection circuit 77 detects the current $i_1$ of the motor at the former time and the current $i_2$ at the latter time and outputs the detected signal to an arithmetic circuit 78. The arithmetic circuit 78 inputs the output from the load current detection circuit 77, and compares $i_2-i_1$ with the reference current $i_0$ of the reference current generation circuit 75, and outputs the result to the revolution number regulator 76. The revolution number regulator 76 inputs the output of the arithmetic circuit 78, and if $i_0 > i_2-i_1$, the revolution number regulator 76 judges that the material has a small initial viscosity, in other words, the material uses raw cream containing vegetable fat, and outputs a signal to the current controller 73 for rotating the motor 1a at a middle speed. On the other hand, if $i_0 < i_2-i_1$, the revolution number regulator 76 judges that the material has a large initial viscosity, in other words, the material uses raw cream containing milk fat, and outputs a signal to the current controller 73 for rotating the motor 1a at a high speed.

The timer circuit 74, the reference current generation circuit 75, the load current detection circuit 77 and the arithmetic circuit 78 constitute a viscosity detecting portion, and the current controller 73 and the revolution number regulator 76 constitute a control unit.

The operation of this embodiment will now be explained. When a predetermined amount of material consisting of raw cream, milk, yolk, sugar, etc. is charged into a container 19, and the commercial power source 71 is supplied to drive the motor 1a. At the initial stage of the operation, the current controller 73 so controls the motor 1a that the agitator 30 rotates at a low speed of about 6,000 to 7,000 rpm, thereby uniformly mixing the material. At the initial stage of the operation, since the viscosity of the material is low, the material will be vehemently flown about due to the rotational force of the disc portion outwardly. However, since the rotational speed of the agitator 30 is low, the agitation force is comparatively small, and the material is agitated with good efficiency in adequate contact with the discal portion 30a. The material is therefore circulated along the inner wall of the container 19 and whipped.

The currents 10 seconds after the start, namely, about a time when a material assumes a substantially uniformly mixed state and 5 seconds thereafter are detected by the load current detection circuit 77, and the arithmetic circuit 78 compares the difference $i_2-i_1$ between the load current $i_1$ 10 seconds after the start and the load current $i_2$ 5 seconds thereafter with the reference current $i_0$. If $i_0 < i_2-i_1$, the current controller 73 largely increases the current supplied to the motor 1a to rotate the motor 1a at a high speed of about 14,000 rpm. On the other hand, if $i_0 > i_2-i_1$, the current controller 73 increases the current supplied to the motor 1a to rotate the motor 1a at a middle speed of about 10,000 rpm. That is, in the case of producing an ice cream material prepared for freezing from a material having a comparatively large initial viscosity, in other words, the material using fresh cream containing milk fat, the motor 1a is rotated at a high speed, while in the case of producing an ice cream material prepared for freezing from a material having a small initial viscosity, in other words, the material using fresh cream containing vegetable milk fat, the motor 1a is rotated at a middle speed.

As the whipping operation proceeds, the viscosity of the material is increased and the circulation of the material due to the rotational force of the discal portion 30a is lowered and the upper end of the indicator rod 30b of the agitator 30 is covered with the material. This is the time when the material has been whipped to an overrun of 60 to 100% and to a predetermined viscosity, in other words, the original volume of the material has been increased to 1.6 to 2.0 times, thereby assuming the optimum state of an ice cream material prepared for freezing.

Although the number of revolutions of the agitator is rapidly changed from a low-speed rotation to a high-speed rotation or a middle-speed rotation in this embodiment, it may be changed gradually.

As described above, this embodiments is advantageous in that it is capable of controlling the number of revolutions in accordance with the viscosity of a material, thereby automatically whipping the material to the optimum state.

What is claimed is:

1. An apparatus for whipping a product, comprising:
a container for holding the product therein;
means for agitating and whipping the product in said container to a predetermined degree of whipping at which the volume of the product has increased due to the whipping by at least 60 percent, said agitating and whipping means including a rotatable member having a center of rotation; and
means for indicating when the product has been whipped to said predetermined degree of whipping by said rotatable member, said indicating means including an upper end of an indicator rod, said indicator rod extending from said rotatable member to a height at said upper end that is above an upper surface of a central portion of the product while the product is being whipped by said rotatable member for as long as the product has not achieved said predetermined degree of whipping and that is thereafter below the upper surface of the central portion of the product after the product has been whipped to said predetermined degree of whipping by said rotatable member, said central portion of the product rising along said indicator rod during the whipping, said rotatable member having a disc-shaped portion,
an auxiliary agitator having an auxiliary disc-shaped portion with a diameter larger than that of said disc-shaped portion of said rotatable member, said auxiliary disc-shaped portion being fitted over and rotatable together with said disc-shaped portion of said rotatable member so as to agitate and whip the product, said auxiliary agitator also having an auxiliary indicator element which is fitted over said indicator rod so as to have a height at which the upper surface of the central portion of the produce reaches when an amount of the product in the container is more than a corresponding amount of the product required to reach said height of said indicator rod for achieving said predetermined degree of whipping.

2. An apparatus for whipping a product, comprising:
a container for holding the product therein;
means for agitating and whipping the product in said container to a predetermined degree of whipping at which the volume of the product has increased due to the whipping by at least 60 percent, said agitating and whipping means including a rotatable member having a center of rotation; and
means for indicating when the product has been whipped to said predetermined degree of whipping by said rotatable member, said indicating means including an upper end of an indicator rod, said indicator rod extending from said rotatable member to a height at said upper end that is above an upper surface of a central portion of the product while the product is being whipped by said rotatable member for as long as the product has not achieved said predetermined degree of whipping and that is thereafter below the upper surface of the central portion of the product after the product has been whipped to said predetermined degree of whipping by said rotatable member, said central portion of the product rising along said indicator rod during the whipping;
an auxiliary indicator element which is removably fitted over said indicator rod so as to have a height at which the upper surface of the central portion of the product reaches when an amount of the product in the container is more than a corresponding amount of the product required to reach said height of said indicator rod for achieving said predetermined degree of whipping.

3. An apparatus according to claim 2, wherein said indicator rod has a substantially conical shape.

4. An apparatus according to claim 2, wherein said indicator rod has a substantially columnar shape.

5. An apparatus according to claim 2, further comprising:
means for rotatably driving said rotatable member;
a control unit for controlling said rotatably driving means so that said agitator rotates at a low speed for a predetermined time initially and thereafter rotates at a high speed which is faster than said low speed.

6. An apparatus according to claim 2, wherein said rotatably driving means includes a motor, further comprising:
   means for detecting motor load current; and
   a control unit for controlling said motor so that a number of revolutions of said agitator changes in correspondence with changes in output detected by said motor load current detecting means.

7. An apparatus according to claim 2, further comprising:
   means for rotatably driving said rotatable member;
   a mixer body for housing said rotatably driving means, said container being placed on said mixer body so that the product is receivable through an opening in an upper portion of said container.

8. An apparatus according to claim 2, wherein said auxiliary indicator element is concentric with said indicator rod.

9. An apparatus according to claim 2, further comprising:
   means for operating said agitating and whipping means to serve as an ice cream material mixer without effecting freezing and thereby produce ice cream material as the product in preparation for freezing.

10. An apparatus according to claim 2 in combination with the product to be whipped in the container, wherein the product is a raw material including raw cream, milk, yolk and sugar.

11. An apparatus according to claim 2, wherein said agitating and whipping means whips the product to said predetermined degree of whipping at which the volume of the product has increased due to the whipping between 60 percent and 100 percent.

12. An apparatus according to claim 2, wherein said agitating and whipping means is formed for whipping the product to said predetermined degree of whipping at which a viscosity of the product is such that no air from the product releases outside.

13. An apparatus for whipping a product, comprising:
   a container for holding the product therein;
   means for agitating and whipping the product in said container to a predetermined degree of whipping at which the volume of the product has increased due to the whipping by at least 60 percent, said agitating and whipping means including a rotatable member having a center of rotation; and
   means for indicating when the product has been whipped to said predetermined degree of whipping by said rotatable member, said indicating means including an upper end of an indicator rod, said indicator rod extending from said rotatable member to a height at said upper end that is above an upper surface of a central portion of the product while the product is being whipped by said rotatable member for as long as the product has not achieved said predetermined degree of whipping and that is thereafter below the upper surface of the central portion of the product after the product has been whipped to said predetermined degree of whipping by said rotatable member, said central portion of the product rising along said indicator rod during the whipping, said rotatable member having a disc-shaped portion with a center of rotation, said rotatable member having a protruding rod portion integrally formed with said disc-shaped portion so as to protrude from said center of rotation of said disc-shaped portion, said indicator rod being removably mounted on said protruding rod portion and extending to said height.

14. An apparatus according to claim 13, wherein said protruding rod portion is columnar, said indicator rod being fitted over said protruding rod portion so as to be slidable in a direction to said height.

15. An apparatus according to claim 14, wherein said indicator rod is retainable at a desired height along said protruding rod portion by friction forces.

16. An apparatus according to claim 14, wherein said indicator rod is retainable at a desired height along said protruding rod portion by engagement between said indicator rod and said protruding rod portion.

* * * * *